(12) United States Patent
Adams (10) Patent No.: US 6,350,037 B1
(45) Date of Patent: Feb. 26, 2002

(54) AUTOMOBILE SAFETY MIRRORS TO ELIMINATE BLIND SPOT

(76) Inventor: Thomas D. Adams, 9269 Campo Rd., Spring Valley, CA (US) 91977

( * ) Notice: Subject to any disclaimer, the term of this patent is extended or adjusted under 35 U.S.C. 154(b) by 0 days.

(21) Appl. No.: 09/548,483

(22) Filed: Apr. 13, 2000

(51) Int. Cl.$^7$ ............................. B60R 1/06; B60R 1/08; B60R 16/02

(52) U.S. Cl. ...................... 359/843; 359/838; 359/877; 307/10.2

(58) Field of Search ................................ 359/843, 877, 359/838; 307/10.1

(56) References Cited

U.S. PATENT DOCUMENTS

| | | | | |
|---|---|---|---|---|
| 4,318,590 A | * | 3/1982 | Hanley | 359/843 |
| 4,792,220 A | * | 12/1988 | Janowicz | 359/843 |
| 4,834,522 A | | 5/1989 | Janowicz | |
| 4,906,089 A | | 3/1990 | Biondi et al. | |
| 4,907,870 A | | 3/1990 | Brucker | |
| 5,035,496 A | * | 7/1991 | An | 359/843 |
| 5,126,885 A | * | 6/1992 | Gray | 359/843 |
| 5,159,497 A | | 10/1992 | Lynas | |
| 5,189,561 A | * | 2/1993 | Hong | 359/843 |
| 5,210,652 A | * | 5/1993 | Perkinson | 359/877 |
| 5,566,028 A | | 10/1996 | Wodeslavsky | |
| 5,745,310 A | | 4/1998 | Mathieu | |
| 5,886,838 A | * | 3/1999 | Kuramato | 359/843 |
| 6,193,380 B1 | * | 2/2001 | Jacobs | 359/843 |

FOREIGN PATENT DOCUMENTS

| | | | | |
|---|---|---|---|---|
| DE | 3520972 A1 | * | 6/1986 | 307/10.1 |
| DE | 3705991 A1 | * | 9/1988 | |
| DE | 4115474 A1 | * | 5/1991 | |
| DE | 4334800 A1 | * | 5/1994 | |
| DE | 4423744 A1 | * | 4/1995 | |
| FR | 2579149 | * | 9/1986 | |

* cited by examiner

*Primary Examiner*—Cassandra Spyrou
*Assistant Examiner*—John Juba, Jr.
(74) *Attorney, Agent, or Firm*—Page Lohr (57) ABSTRACT

A special configuration of devices includes mirrors which operate to give a driver an easy and complete view around an automobile. More precisely, standard rear view mirrors are arranged in a manner to switch between providing a normal rear view and a quick look into the region sometimes and herein known as the blind spot. Switches which are specially located on a steering wheel provide access to a control system whereby a driver may operate the device without removing hands from their proper position on the steering wheel. Activation of the switch yields a mirror movement allowing a driver to check a blind spot before changing lanes.

6 Claims, 7 Drawing Sheets

AUTOMOBILE SAFETY MIRRORS TO ELIMINATE BLIND SPOT

BACKGROUND OF THE INVENTION

1 Field

The field of these inventions described herefollowing may be characterized as automobile safety mirrors arranged to eliminate the blind spot and more specifically as active mirrors which may be easily triggered without interrupting a driver's attention.

2 Prior Art

A well known difficulty with driving includes the problem of incomplete vision with respect to the view around a car. The practical limit for a driver to turn his head presents the need for "rear view" mirrors. Although use of mirrors allows one to see substantially all around an automobile, there exists an effect known as a "blind spot". Even a well placed mirror leaves a section of view unaddressed; accordingly the phenomena known as a blind spot.

Simple solutions to address the problem of a blind spot include positioning a spherical mirror in the lightly used corner of a normally configured rear view mirror. While consuming a portion of the useful area of a mirror, the spherical device permits one to see in many directions simultaneously; including into the region described as the blind spot. However, the distortion which necessarily accompanies spherical mirrors increases the difficulty of using these devices. Particularly, the size and range of objects viewed in these mirrors is difficult to properly ascertain.

Another simple solution is to place a small planar mirror, typically at the exterior edge, with an bias angle in relation to the primary mirror. The angled mirror thus directs reflected light from a different portion of the view towards the drivers eyes. Via use of this special mirror, the driver may look into the blind spot. However, it is sometimes difficult to process and understand two images simultaneously. These mirrors tend to distract and confuse the scene of a rear view. They are difficult to use properly and thus do not win the favor of most users.

The current state of the art is illustrated by the following six U.S. patents which include:

U.S. Pat. No. 5,745,310, an invention by Mr. Mathieu relating to method and apparatus for temporary view shifting of vehicle side mirrors. A sophisticated arrangement of armature rods and actuators is connected to a mirror back surface. This special arrangement of parts must be installed to enable the invention and the device will not operate with standard factory installed automotive mirrors.

An invention taught by Wodeslavsky in U.S. Pat. No. 5,566,028 shows how a simpler system may be arranged to move a mirror in a mirror housing. A vacuum system is coupled to a mirror such that suction force produced at an engine pulls a mirror into a position where it can be used to view a blind spot. In particular, when one applies a turn indicator a solenoid is engaged which drives a valve to cause suction at a diaphragm which moves a mirror. Like the system above, special hardware is required as standard automotive mirrors do not come equipped with vacuum apparatus. It is further a problem that the device does not operate independent of the turn indicators. It is not always the case that one should want to view the blind spot while the turn indicator is on. One may wish to briefly look into the blind spot but not the entire time that a turn indicator is active.

Inventor Lynas employs a special five position turn indicator switch to account for the difference between lane change actions and full turn actions. To effect a lane change signal, a driver must operate and hold a lever in a special intermediate position. While the lever is in this special position, it used to activate a solenoid coupled to a rear view mirror. This system requires special hardware to be coupled within the mirror housing and requires that a driver remove his hand from its proper place on the wheel to hold a lever while making a lane change action.

In U.S. Pat. No. 4,907,870 a device is presented which allows a driver to operate a lever in the door causing a mirror position to change such that a blind spot can be viewed. The driver must take considerable attention from his driving duty including removing his hands from their position on the wheel. Additionally, the system requires that special hardware be installed in the mirror housing.

Systems taught by Biondi et al, U.S. Pat. No. 4,906,089 and Janowicz, U.S. Pat. No. 4,834,522 similarly suffer from the requirement that complex hardware needs to be installed.

While the systems and inventions of the art are designed to achieve particular goals and objectives, some of those being no less than remarkable, these inventions have limitations which prevent their use in new ways now possible. These inventions of the art are not used and cannot be used to realize the advantages and objectives of the present invention.

SUMMARY OF THE INVENTION

Comes now, Thomas D. Adams with inventions of active automobile mirrors including devices and methods of moving mirrors which eliminate the blind spot. It is a primary function of these active mirrors to provide a safe way to eliminate the blind spot. It is a contrast to prior art methods and devices that systems of the art do not allow a driver to easily activate a system without diverting attention from driving duties. Systems in the art each require that special hardware be coupled to a mirror and those systems necessarily will not cooperate well with standard automobile mirrors. Present inventions thus stands in contrast to methods and devices known in the art.

OBJECTIVES OF THE INVENTION

It is a primary object of the invention to provide a safe system for eliminating the blind spot of a driver's view.

It is an object of the invention to provide an easy to use system which does not distract a driver's attention.

It is a further object to provide an automatic system which is activated by a driver.

It is an object of the invention to provide an automatic system which is operated from a control properly located on a steering wheel.

It is an object to provide a system which cooperates with standard automotive equipment.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

GLOSSARY OF SPECIAL TERMS

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Al though every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must use the context of use and liberal discretion to arrive at an intended meaning. One will be well advised to error on the side of attaching broader meanings to terms used in order to fully appreciate the depth of the teaching and to understand all the intended variations.

Blind Spot

A blind spot is the region of space which is difficult or impossible to see from a well placed rear view mirror as seen from the operator of an automobile.

Rear View Mirror

A rear view mirror is a mirror arranged to provide the driver of an automobile a view in a direction towards the rear of the automobile. A rear view mirror may include those placed on both the driver's side and the passenger's side of the automobile.

Conveyance Means

A convenance means is any system arranged to transmit a signal from a first physical location to another. Examples include wires, radio waves, IR beams, audio channels, et cetera.

PREFERRED EMBODIMENTS OF THE INVENTION

In accordance with each of the preferred embodiments of the invention, there is provided automobile safety mirrors to eliminate blind spot. It will be appreciated that each of the embodiments described may include apparatus and that an apparatus of one preferred embodiment may be different than an apparatus of another embodiment.

Figure 1:
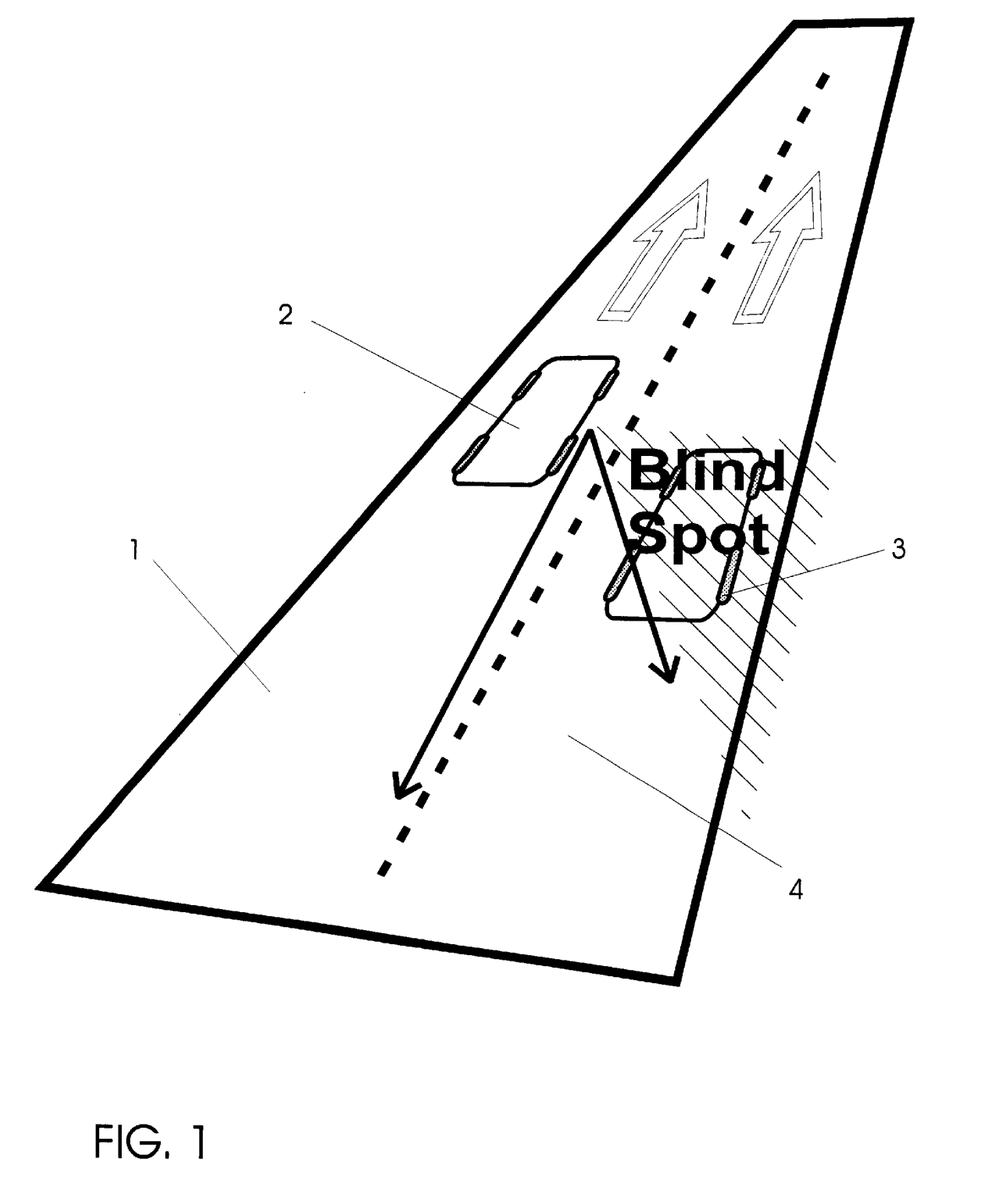
FIG. 1 illustrates a region commonly referred to as a blind spot.

With reference to drawing FIG. 1, the reader will be reminded of a scenario which illustrates a blind spot. A two lane roadway 1 may include two cars 2, and 3, traveling in the same direction. A driver in the car 2 may use rear view mirrors to look behind and into the adjacent lane, at a region 4 illustrated between arrows. It is not always possible to see car 3 from the rear view mirror because car 3 is said to be in the blind spot with respect to car 2.

Figure 2:
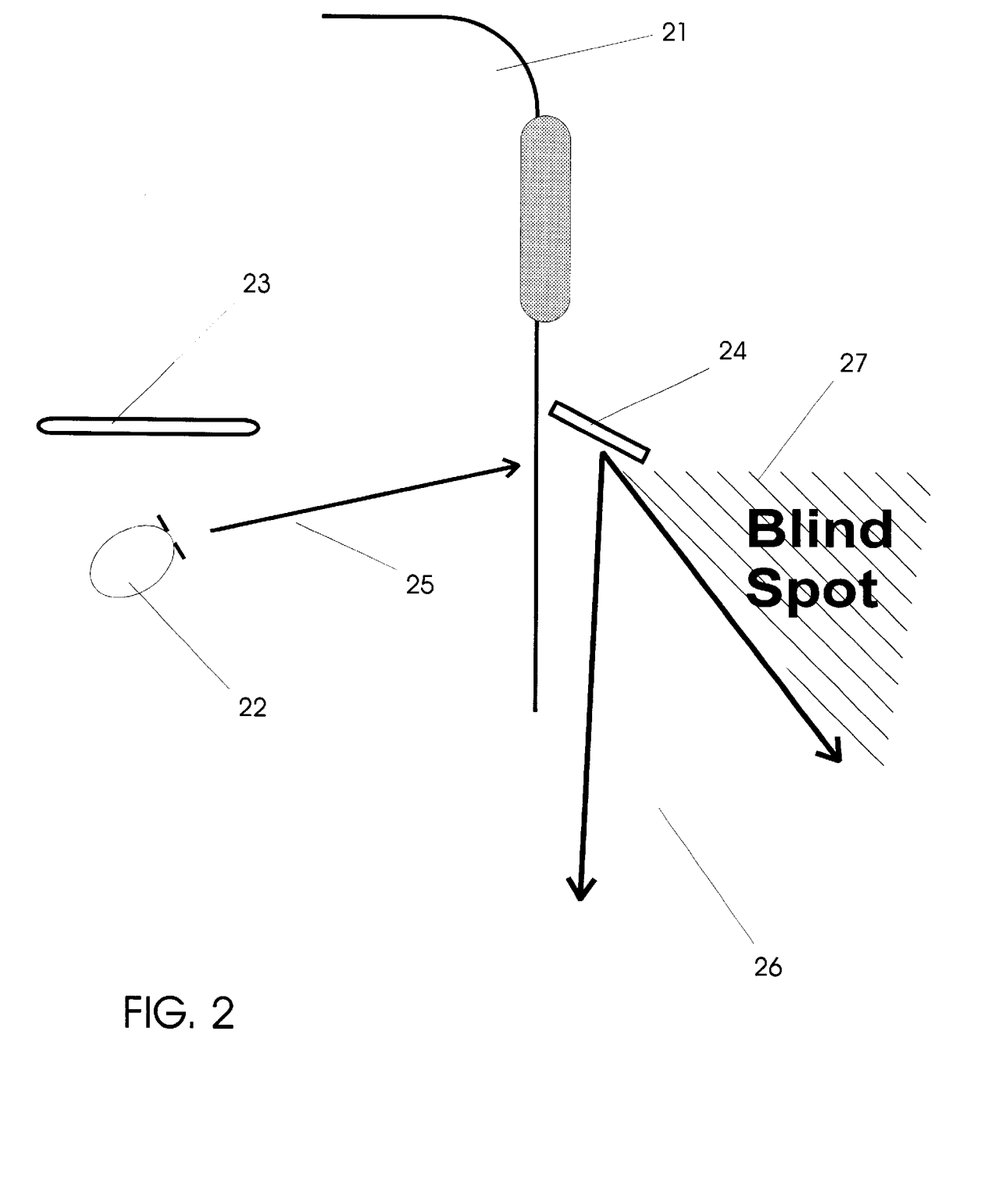
FIG. 2 is a two dimension schematic to illustrate a blind spot with respect to a drivers view.

Proper use of a correctly positioned rear view mirror allows a driver to see traffic behind and to the rear of the driver. A more precise understanding may be realized with reference to FIG. 2 where car 21 is illustrated. Driver 22 behind steering wheel 23 with head slightly turned toward rear view mirror 24 to effect a view direction indicated by arrow 25 allows a driver a clear view of region 26 behind the car. The region 27 slightly behind and immediately aside the car is sometimes and herein referred to as the blind spot.

Figure 3:
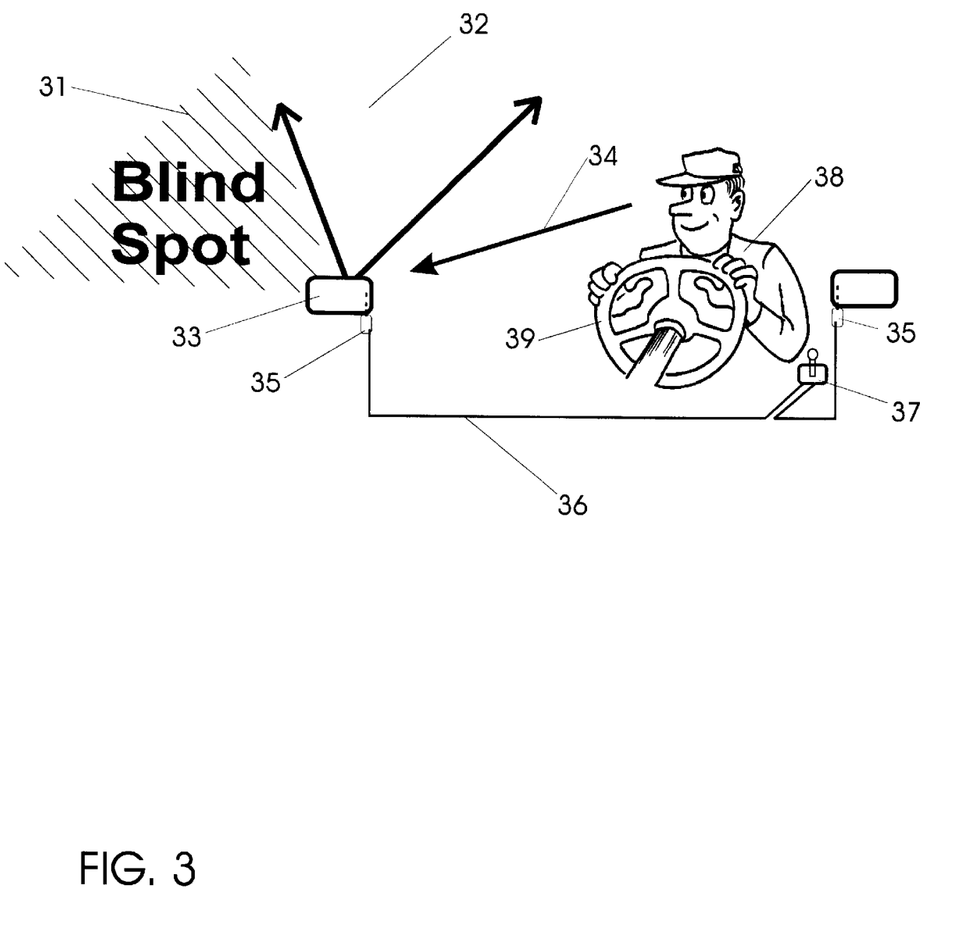
FIG. 3 is a perspective drawing to illustrate a driver in proper driving position with respect to side rear view mirrors.

The cartoon drawing of FIG. 3 shows a perspective view of important elements of the scenario of interest. Blind spot region 31 is not within a driver's view as only a clear view of region 32 is afforded by mirror 33 which is being addressed by a driver having a view direction 34.

Modem automotive mirrors come as standard equipment with an electronic actuator for adjusting the mirrors. The figure illustrates such actuator 35 which is affixed to and coupled to rear view mirrors. Rear view mirror actuators typically operate to move and rotate a mirror about two axes which are preferably orthogonal to each other. The actuator may be coupled by way of a mechanical link or a electrical wire 36 to a joystick type tactile device 37 easily operated by a driver's hand. By way of the actuator, joystick and conveyance therebetween, a driver 38 while in the correct driving position behind the steering wheel 39 can adjust the mirror to give the best rear view.

Although it is mechanically possible to use the adjustment system to move the mirror such that a clear view of the blind spot is attained, it is not generally adjusted this way because a driver is then left without a rear view which extends far enough behind the car where dangerous traffic may exist.

Figure 4:
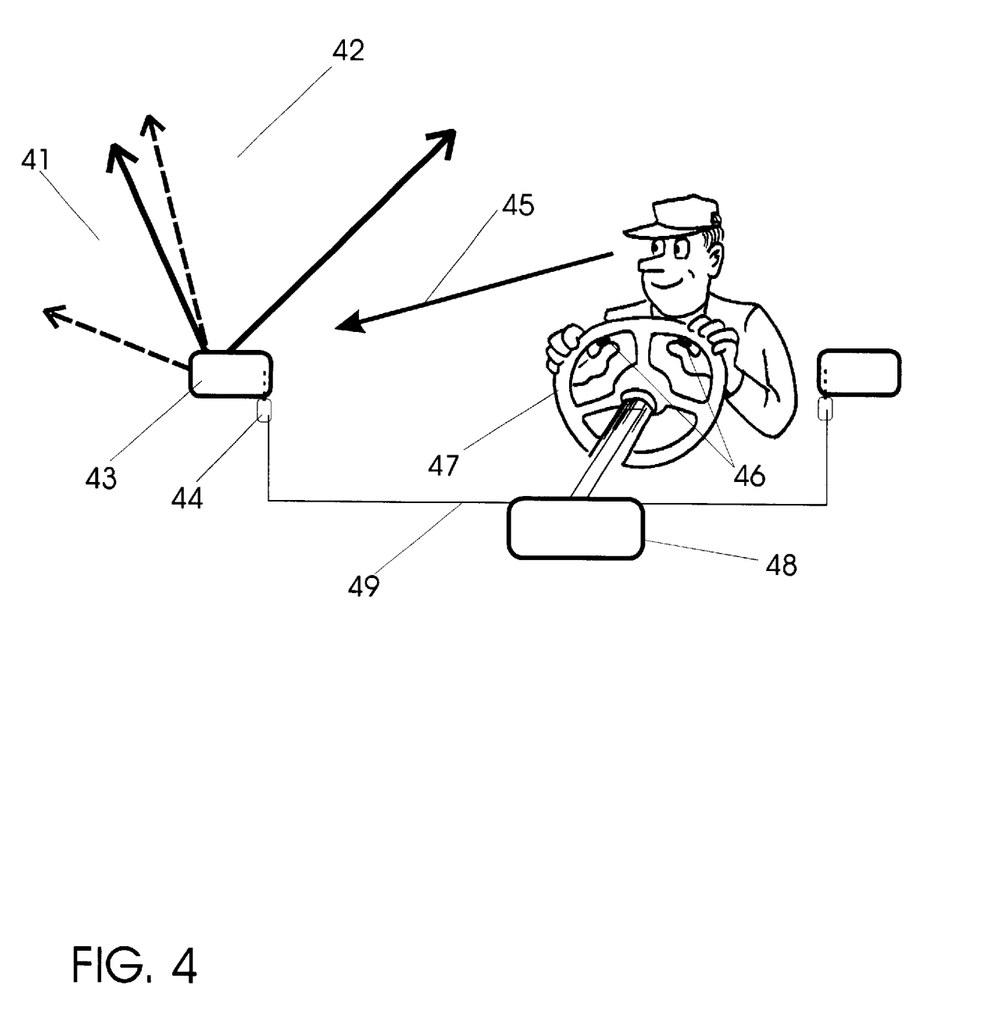
FIG. 4 is a similar perspective showing a driver with hands placed on a steering wheel.

FIG. 4 illustrates very important aspects of present inventions. In particular, both regions a blind spot region 41, and a normal rear view region 42 can be viewed with the same mirror 43 which is driven by a standard equipment actuator 44 while the driver's view angle 45 remains unchanged. Additionally, this is accomplished where the driver is not forced to remove his hands from the proper positions on the steering wheel 47. This is achieved by way of two specially located switches 46. Electronic switches may be placed on the inside periphery of the steering wheel where they may be easily engaged by a driver's thumbs while the driver's hands remain on the steering wheel in their proper positions. A first switch may be arranged to be operated by a driver's right hand, i.e. is placed in the 2 o'clock position on the steering wheel, and is further connected to operated the passenger side rear view mirror. A second switch is similarly arranged to be operated by a driver's left hand, the switch being placed in the 10 o'clock position on the inside periphery of the steering wheel, connected to the driver's side rear view mirror. A driver is thereby enabled the important function of complete control of his mirrors, including means for quickly and easily checking the blind spot, without need for removing his hands from the steering wheel.

The switches are conveniently located on the inside of the steering wheel. A careful reader will recognize a secondary advantage for locating the switches there. An accessory which is commonly used with steering wheels is the steering wheel cover. A steering wheel cover is sometimes provided for comfort and fashion and is usually added to a steering wheel after a car is purchased. Most common steering wheel covers wrap around a steering wheel to form a seem at the inside periphery of the steering wheel. As such, switches located at the inside periphery of the steering wheel do not interfere with the application of a steering wheel cover.

By operating either of the switches, a driver causes a signal to be transmitted to an electronic controller 48 via a conveyance such as a wire 49 or other electronic communication means. The controller then provides a special signal to the mirror actuators.

In some versions of the invention, the button is simply pressed once like a computer mouse click operation. In response to the button click, the electronic controller produces a compound drive signal which causes the mirror actuators to move the mirror quickly to a position whereby the driver can view the blind spot. The actuator holds the mirror in this position for a brief time, for example 500 milliseconds, then slowly returns the mirror to its normal position in a scan motion.

Figure 5:
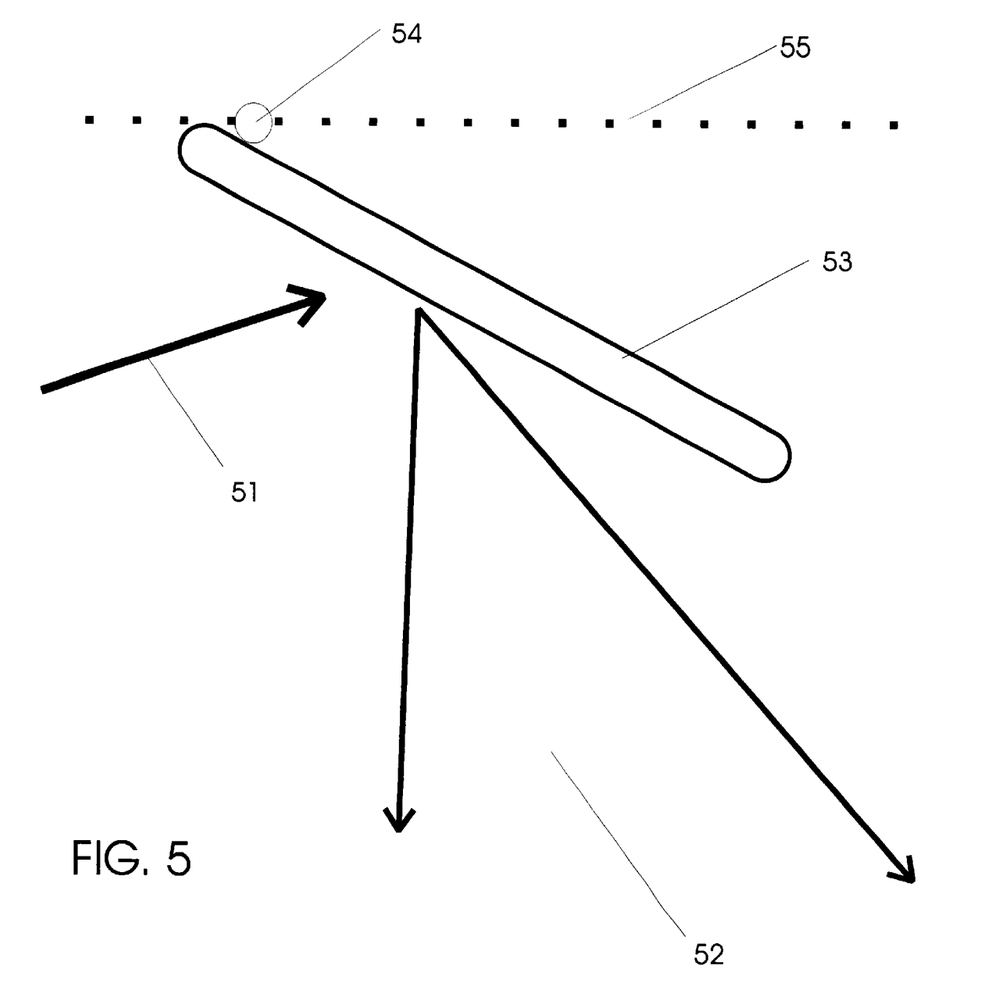
FIG. 5 is a schematic drawing showing a first mirror position and corresponding view.

For perfect clarity, FIG. 5 illustrates the relationship between the position of a mirror, a view direction, and a view region or field-of-view. View direction 51 corresponds to the normal direction in which a driver may look to see a rear view, field-of-view 52 while using a mirror 53 arranged as a rear view type mirror. For adjustment purposes, mirrors may be rotatably movable and may be arranged to pivot about axes such as one illustrated in the figure as 54. Reference dotted line 55 is provided for clarity and so that the angle of the mirror about its axis is easily understood. Although only one axis is shown, it is well known in the art to arrange a mirror to rotate about two axes.

Figure 6:
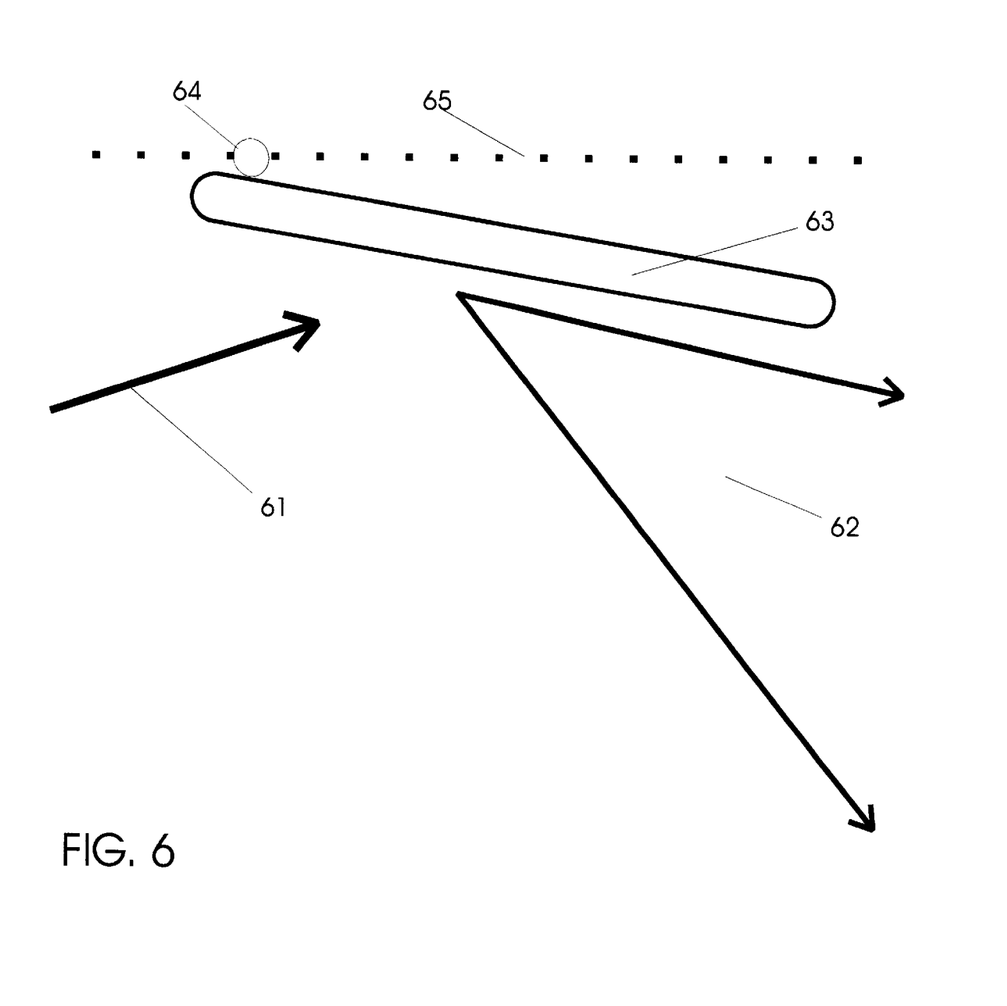
FIG. 6 is a similar drawing showing a special mirror position and view.

While a driver's view angle does not change appreciably, a mirror may be manipulated to change the field-of-view visible in the mirror. Driver's view angle 61 substantially the same as that shown in FIG. 5, allows a view of region 62 when mirror 63 is moved about pivot axis 64 towards horizontal reference line 65.

Figure 7:
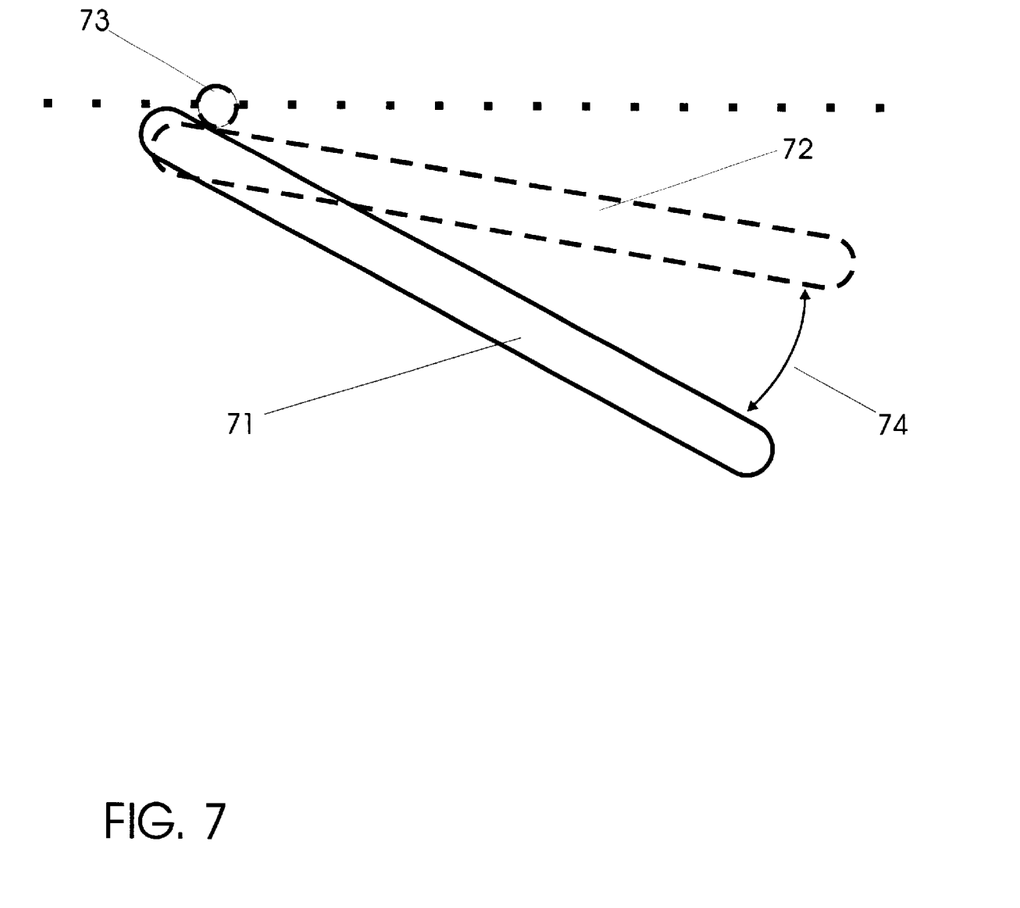
FIG. 7 relates two mirror positions with respect to each other.

FIG. seven shows two mirror positions superimposed upon each other. It is to be understood that there exists only one mirror but that two mirror positions are shown for comparison purposes. Thus, one mirror position is shown as a dotted line 'in phantom'. A first mirror position 71 may correspond to a first field-of-view while a second mirror position 72 may correspond to a second field-of-view. Rotation about axis 73 causes a mirror to move from the first position to the second position over some predetermined rotation angle 74.

One will appreciate that arrangements of the invention suggest that there are two mirror positions of great importance. One position allows a driver to normally view the rear view and the other allows a driver to see into the blind spot. It is also acknowledged that a view angle may be different for each driver who may wish to use an automobile. Accordingly, electronic controllers of the invention are arranged to have these two mirror positions adjustable and preset by drivers. Before operation of a vehicle, the system allows a driver to set the normal view mirror position, and then set a blind spot mirror position. The controller is arranged with an electronic memory to remember these positions which may be changed from driver to driver or even from use to use. During operation of the automobile, the driver may simply activate the mirror control button to cause the controller to switch mirror positions between the normal rear view and the blind spot view.

An alternative version is arranged to have a controller operate to move a mirror to the position where the blind spot can be viewed while the corresponding button is pressed and held. In such arrangements, a driver wishing to change lanes presses and holds a button on the inside periphery of a steering wheel. When the driver has had the opportunity and has finished checking the blind spot, he releases the button and the mirror controller quickly moves the mirror back to the normal driving position. In this way, the driver is afforded the opportunity to look into the blind spot for as long as he wishes without being forced to complete his check in a limited period of time.

In other alternative versions, special switches are used. A switch having three positions, neutral, forward and back is used to operate the mirror such that it is advanced continuously over the range between the two preset positions at the discretion of the driver. Thus a mirror may be scanned from the first position to the second position and may be paused at any position therebetween. This system allows a driver a clear view of any region between the preset normal rear view and the bind spot view. Upon release of the button for an extended time, the mirror automatically moves back the preset normal rear view position.

The examples above are directed to specific embodiments which illustrate preferred versions of devices and methods of the invention. In the interests of completeness, a more general description of devices and the elements of which they are comprised as well as methods and the steps of which they are comprised is presented hereinfollowing. One will now fully appreciate how active mirrors may be arranged and operated such that a driver is afforded a clear view of a blind spot while not diverting attention from regular driving duties. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

It is claimed:

1. An apparatus arranged as automobile safety mirrors to eliminate 'blind spot' said apparatus comprising:
   at least one switch;
   at least one mirror;
   at least one mirror actuator;
   an electronic controller; and
   conveyance means,
   said at least one switch being positioned and affixed to an inside periphery of a steering wheel and coupled to said conveyance means whereby operation or activation of either of said at least one switch causes a signal to be conveyed by the conveyance means,
   said electronic controller is connected to and coupled to said conveyance means such that a signal may be received at said electronic controller, said electronic controller further being coupled to said at least one mirror actuator such that a mirror actuator is driven by signals provided thereby said electronic controller, and
   said mirror actuator being coupled to said at least one mirror in a manner whereby the mirror may be moved and rotated,
   said at least one switch, at least one mirror, and at least one actuator is exactly two switches, two mirrors and two actuators, where a first switch drives a first mirror via a first actuator and a second switch independently drives a second mirror via a second actuator,
   said electronic controllers are used to operate the mirror such that it is advanced continuously over the range between two preset positions at the discretion of the driver whereby a mirror may be scanned from the first position to the second position and may be paused at any position therebetween.

2. An apparatus of claim 1, the first switch is located and affixed to an inside perimeter on the steering wheel at a position corresponding to 10 o'clock and the second switch is located and affixed to an inside perimeter on the steering wheel at a position corresponding to 2 o'clock; the switch positioned at 10 o'clock drives a driver side mirror, and the switch positioner at 2 o'clock drives a passenger side mirror.

3. An apparatus of claim 1, said switches produce a signal which drive mirrors continuously between the normal position and the blind spot position.

4. An apparatus of claim 1, said switches may be easily engaged by a driver's thumbs while the driver's hands remain on the steering wheel in positions 2 to 3 o'clock and 9–10 o'clock without need for removing hands from the steering wheel.

5. An apparatus of claim 4, said switches being arranged to cooperate with steering wheel covers which wrap around a steering wheel to form a seam at the inside periphery of the steering wheel whereby switches located at the inside periphery of the steering wheel do not interfere with the application of a steering wheel cover.

6. An apparatus of claim 1, said electronic controllers having an electronic memory to remember two positions which may be changed from driver to driver or even from use to use, the electronic controllers being arranged to allow a driver to set the normal view mirror position, and then set a blind spot mirror position.

* * * * *